United States Patent
Kaja et al.

(10) Patent No.: US 10,902,418 B2
(45) Date of Patent: Jan. 26, 2021

(54) SYSTEM AND METHOD USING INTERACTION TOKEN

(71) Applicant: Visa International Service Association, San Francisco, CA (US)

(72) Inventors: Venkata Naga Pradeep Kumar Kaja, Foster City, CA (US); Vijayaraju Konkathi, Union City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 146 days.

(21) Appl. No.: 15/585,077

(22) Filed: May 2, 2017

(65) Prior Publication Data
US 2018/0324184 A1    Nov. 8, 2018

(51) Int. Cl.
| | |
|---|---|
| *G06Q 20/38* | (2012.01) |
| *H04L 29/06* | (2006.01) |
| *H04W 12/08* | (2009.01) |
| *G06Q 20/40* | (2012.01) |
| *H04W 12/06* | (2009.01) |

(52) U.S. Cl.
CPC ... *G06Q 20/38215* (2013.01); *G06Q 20/4018* (2013.01); *H04L 63/0428* (2013.01); *H04L 63/083* (2013.01); *H04L 63/0807* (2013.01); *H04L 63/10* (2013.01); *H04L 63/108* (2013.01); *H04W 12/0608* (2019.01); *H04W 12/08* (2013.01); *G06Q 2220/00* (2013.01)

(58) Field of Classification Search
CPC ..... G06Q 20/3672; G06Q 20/38; G06Q 30/06
See application file for complete search history.

(56) References Cited

U.S. PATENT DOCUMENTS

| | | | |
|---|---|---|---|
| 5,613,012 A | 3/1997 | Hoffman | |
| 5,781,438 A | 7/1998 | Lee | |
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |

(Continued)

FOREIGN PATENT DOCUMENTS

| | | |
|---|---|---|
| EP | 2156397 A1 | 2/2010 |
| KR | 1020110006732 A | 1/2011 |

(Continued)

OTHER PUBLICATIONS

International Search Report and Written Opinion, dated Aug. 10, 2018, in PCT Application No. PCY/US2018/029779, 13 pages.

(Continued)

*Primary Examiner* — Joshua D Taylor
(74) *Attorney, Agent, or Firm* — Kilpatrick Townsend & Stockton LLP

(57) ABSTRACT

A communication device may receive input from a user and initiate generation of an interaction token in response. This interaction token can be used by the communication device in order search for a specific resource provider computer from among one or more resource provider computers, and to initiate a resource transfer between the user and a specific resource provider, mediated by a token provider computer.

13 Claims, 6 Drawing Sheets

(56) References Cited

U.S. PATENT DOCUMENTS

| | | | |
|---|---|---|---|
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |

(56) References Cited

U.S. PATENT DOCUMENTS

| | | |
|---|---|---|
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0073593 A1 | 4/2007 | Perry et al. |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0198617 A1* | 8/2009 | Soghoian ............... G06Q 20/04 705/65 |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0276484 A1* | 11/2010 | Banerjee ............... G06Q 30/06 235/379 |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |

(56) References Cited

U.S. PATENT DOCUMENTS

| | | |
|---|---|---|
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |

(56) References Cited

U.S. PATENT DOCUMENTS

| | | |
|---|---|---|
| 2014/0046764 A1 | 2/2014 | Fox |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0108263 A1* | 4/2014 | Ortiz .............. G06Q 20/3278 705/71 |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0195323 A1 | 7/2014 | Hankins |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269559 A1* | 9/2015 | Inotay .............. G06Q 20/3274 705/44 |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0155938 A1* | 6/2017 | Wallters ............ H04N 21/4402 |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| KR | 10201505847 B1 | 4/2015 |
| KR | 1020170008652 A | 1/2017 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2015013548 A1 | 1/2015 |

OTHER PUBLICATIONS

"BuyHatke is Helping Customers to Know the Best Time to Shop, Wraps $1 Mn," https://inc42.com/buzz/buyhatke-funded/, May 8, 2015, 8 pages; https://compare.buyhatke.com/company/about-us.php, downloaded May 2, 2017, 2 pages.

"Automated Price Comparison Shopping Search Engine—Price Hunter," www.seas.upenn.edu/~cse400/CSE400_2004_2005/02writeup.pdf, downloaded May 2, 2017, 16 pages.

"PriceZombie, Price Tracker & Price Comparison—Add-ons for Firefox," Aug. 19, 2015, 3 pages.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

Mcguire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

(56) References Cited

OTHER PUBLICATIONS

Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
EP18795026.6 , "Extended European Search Report", dated Apr. 9, 2020, 9 pages.

* cited by examiner

SYSTEM AND METHOD USING INTERACTION TOKEN

BACKGROUND

Interaction tokens are used by the payments industry to reduce fraud risk. For example, an interaction token can be a substitute for a primary account number (PAN). If the interaction token is stolen by an unauthorized person, then the underlying PAN is still safe and does not have to be replaced. Because they reduce fraud, interaction tokens improve user and merchant confidence in the security of payment systems.

Despite their strengths, interaction tokens still present fraud risks. Just as a fraudster can improperly obtain a PAN and use it to make illegitimate purchases, so too could a fraudster illegally acquire an interaction token and use it to make illegitimate purchases. As such, there is a need for additional security and fraud risk reduction.

Embodiments of the invention address these and other problems individually and collectively.

SUMMARY

Embodiments of the invention are directed to methods and systems for provisioning interaction tokens and initiating resource transfers.

One embodiment of the invention is directed to a method. The method comprises receiving, by a communication device operated by a user, user input data comprising a resource identifier for a resource, a time period to acquire the resource, and an interaction value; initiating, by the communication device, generation of an interaction token based at least upon the user input data; initiating, by the communication device, a search from among one or more resource provider computers for the resource over the time period, wherein the search selects a specific resource provider associated with a specific resource provider computer from among the one or more resource provider computers, the specific resource provider providing the resource at a specific value; determining whether the specific value is less than or equal to the interaction value; and initiating transmitting, by the communication device, the interaction token and a resource provider identifier for the specific resource provider computer to a token provider computer, wherein the token provider computer processes the transaction using the interaction token.

Another embodiment of the invention is directed to the communication device configured or programmed to perform the above-noted method.

Another embodiment of the invention is directed to a method. The method comprises receiving, by a token provider computer from a communication device, an interaction token request message comprising user input data comprising a resource identifier for a resource, a time period to acquire the resource, and an interaction value; analyzing the user input data; determining, by the token provider computer, an interaction token based on the user input data; and transmitting, by the token provider computer, the interaction token to the communication device.

Further details regarding embodiments of the invention can be found in the Detailed Description and the Figures.

DETAILED DESCRIPTION

Figure 1:
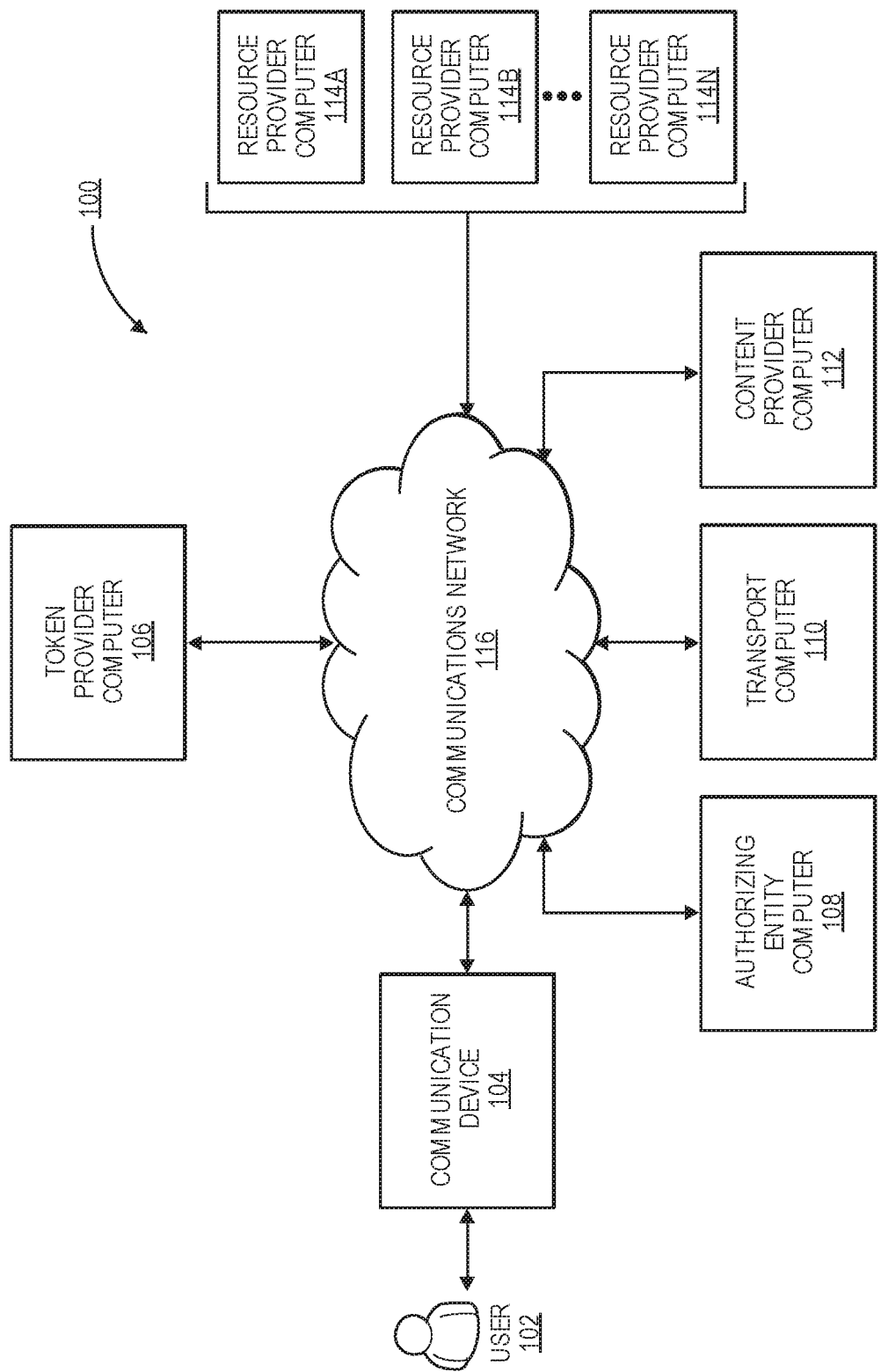
FIG. 1 shows a block diagram of a system according to an embodiment of the invention.

In embodiments of the invention, a token provider computer may, in response to a message from a communication device operated by a user, generate an interaction token that has constraints associated with user input data in the message. The message may indicate that the requested interaction token is for the acquisition of some specific resource, is active or useful over a defined time period, and has a certain value. The token provider further may encrypt and transmit the interaction token to the user communication device. The interaction token may be subsequently used to conduct a transaction for the specific resource.

Prior to discussing specific embodiments of the invention, some terms may be described in detail.

A "user" can be a person or thing that employs some other thing for some purpose. A user may include an individual that may be associated with one or more personal accounts and/or mobile devices. The user may also be referred to as a cardholder, account holder, or consumer in some embodiments.

An "interaction" can be a reciprocal action, effect, or influence. An interaction, for example, could be an exchange or transaction between two or more parties.

A "value" can be some quantity that may be represented with numbers. An example of a value is a quantity such as a quantity of money.

An "interaction value" can be a quantity associated with an interaction. In some embodiments, an interaction value may be determined by a user, and may correspond to a preferred or maximum amount which the user is willing to expend to obtain a particular resource.

A "value reduction element" is something which serves to indicate a reduction in a particular value associated with a resource to be acquired. Examples of value reduction elements may include points, coupons, discounts, etc.

A "resource" is something that may be used by an entity or transferred between entities. Examples of resources include goods, services, information, and/or access to a restricted location.

A "resource identifier" may include an identifier for a particular resource. Examples of resource identifiers may include codes that identify resources, descriptions of resources, or any other data that identifies a resource.

An "interaction token" may be a substitute for a real credential. The interaction token can be used in an interaction between two entities. In some embodiments, an interaction token may be a substitute for a payment account number, such as a primary account number (PAN). For example, an interaction token may include a series of alphanumeric characters that may be used as a substitute for an original account identifier. For example, an interaction token "4900 0000 0000 0001" may be used in place of a PAN "4147 0900 0000 1234." In some embodiments, an interaction token may be "format preserving" and may have a numeric format that conforms to the account identifiers used in existing transaction processing networks (e.g., ISO 8583 financial transaction message format).

"Tokenization" is a process by which data is replaced with substitute data. For example, a payment account identifier (e.g., a primary account number (PAN)) may be tokenized by replacing the primary account identifier with a substitute number (e.g., a token) that may be associated with the payment account identifier. Further, tokenization may be applied to any other information which may be replaced with a substitute value (i.e., a token).

A "token provider computer" can include a computer that that provides or services tokens. In some embodiments, a token provider computer can facilitate requesting, determining (e.g., generating) and/or issuing tokens, as well as maintaining an established mapping of tokens to credentials such as primary account numbers (PANs) in a repository (e.g., a token vault). In some embodiments, the token provider computer may establish a token assurance level for a given token to indicate the confidence level of the token to PAN binding. The token provider computer may include or be in communication with a token vault where the generated tokens are stored. The token provider computer may support token processing of payment transactions submitted using tokens by de-tokenizing the token to obtain the actual PAN.

A "token vault" may be an example of a token service and can include a repository that maintains established token mappings. It may be present in a token provider computer. According to various embodiments, the token vault may also maintain other attributes of the token requestor that may be determined at the time of registration. The attributes may be used by the token provider to apply domain restrictions or other controls during transaction processing. In some embodiments, the token vault may be a part of the token provider. Alternatively, the token vault may be a remote repository accessible to the token provider. Token vaults, due to the sensitive nature of the data mappings that are stored and managed in them, may be protected by strong underlying physical and logical security.

"Token exchange" or "de-tokenization" can include a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request). Token exchange may also be achieved via a credential request message, whereby a requesting entity, which may be a token holder, makes a request to receive a PAN associated with a token.

A "communication device" may comprise any suitable device that can be used for communication. A communication device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, etc. Further examples of communication devices include wearable devices, such as smart watches, fitness bands, ankle bracelets, rings, earrings, etc., as well as automobiles with remote or direct communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "resource provider" may be an entity that can provide resources. Examples of resource providers include merchants, governmental agencies, etc.

A "merchant" may typically be an entity that engages in transactions and can sell goods or services, or provide access to goods or services.

An "acquiring entity" is an entity which can come into possession of something. An acquiring entity may be a business entity (e.g., a commercial bank) that has a business relationship with a particular merchant or other entity. An acquiring entity may operate an acquiring entity computer, which may be generically referred to as a "transport computer."

An "authorizing entity" is an entity which can authorize or approve interactions. An authorizing entity may typically refer to a business entity (e.g., a bank) that maintains an account for a user and is capable of authorizing interactions such as payment transactions, for example the purchase of goods or services.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

FIG. 1 shows a system 100 comprising a number of components. The system 100 comprises a communication device 104 operated by a user 102 as well as a token provider computer 106, an authorizing entity computer 108, a transport computer 110, a content provider computer 112, and one or more resource provider computers 114. All of these entities, providers, and devices may be in operative communication with each other over a communications network 116.

This communications network can take the form of any suitable communication network, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the entities, providers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
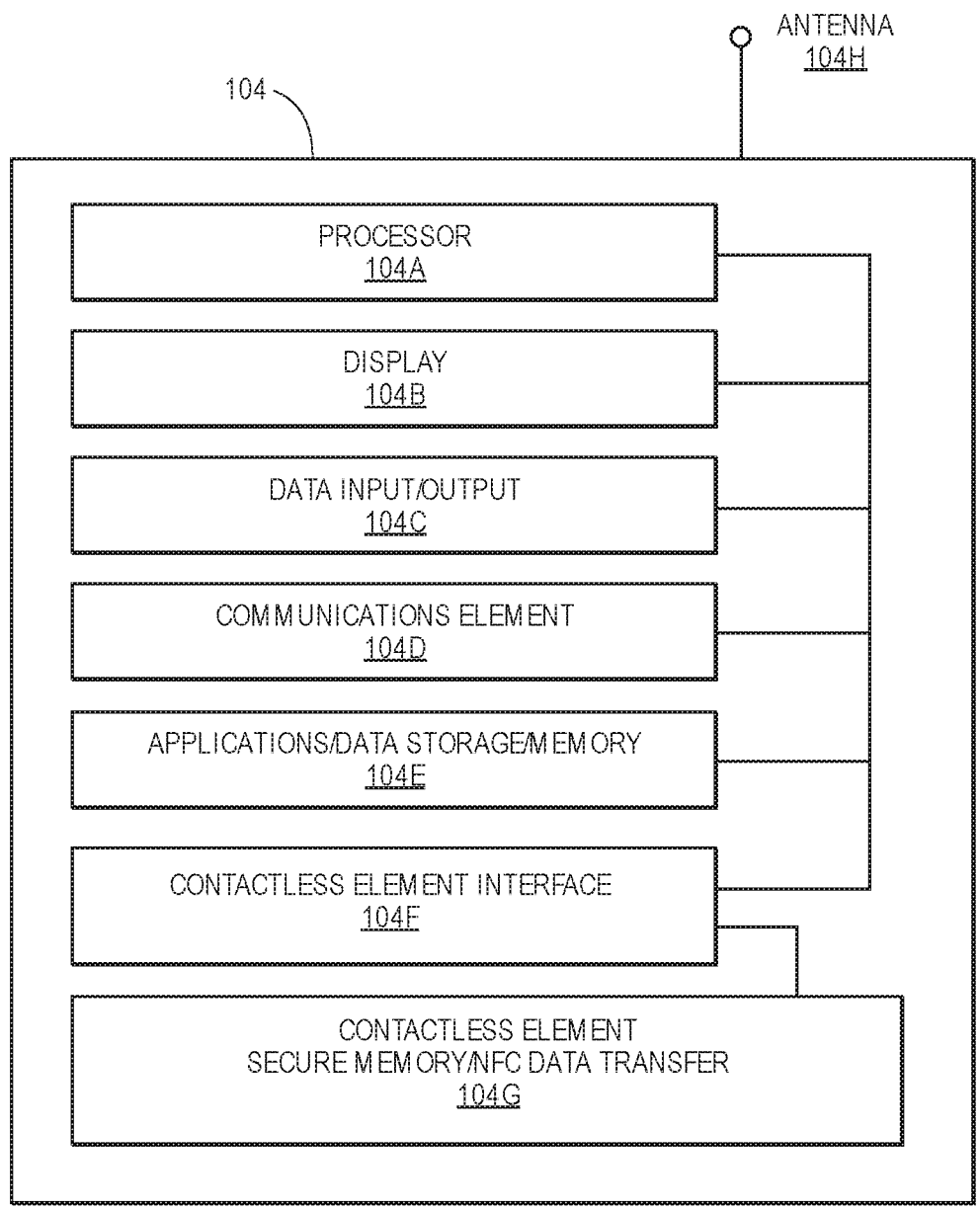
FIG. 2 shows a block diagram of a communication device according to an embodiment of the invention.

FIG. 2 shows an example of a communication device 104 according to some embodiments of the invention. Communication device 104 may include circuitry that is used to enable certain device functions, such as telephony. The functional elements responsible for enabling those functions may include a processor 104A that can execute instructions that implement the functions and operations of the device. Processor 104A may access data storage 104E (or another suitable memory region or element) to retrieve instructions or data used in executing the instructions, such as provisioning scripts and mobile applications. Data input/output elements 104C, such as a keyboard or touchscreen, may be used to enable a user to operate the communication device 104 and input data (e.g., user input data). Data input/output elements may also be configured to output data (via a speaker, for example). Display 104B may also be used to output data to a user. Communications element 104D may be used to enable data transfer between communication device 104 and a wired or wireless network (via antenna 104H, for example), enable data transfer functions, and may be used to assist in connectivity to the Internet or another network. Communication device 104 may also include contactless element interface 104F to enable data transfer between contactless element 104G and other elements of the device, where contactless element 104G may include a secure memory and a near field communications data transfer element (or another form of short range communications technology). As noted, a cellular phone or similar device is an example of a communication device 104 that may be used in accordance with embodiments of the present invention.

The data storage 140E may comprise a computer readable medium comprising code, executable by the processor 104A to implement a method comprising: initiating generation of an interaction token based at least upon the user input data; initiating a search from among one or more resource provider computers for the resource over the time period, wherein the search selects a specific resource provider associated with a specific resource provider computer from among the one or more resource provider computers, the specific resource provider providing the resource at a specific value; determining whether the specific value is less than or equal to the interaction value; and initiating transmitting the interaction token and a resource provider identifier for the specific resource provider computer to a token provider computer, wherein the token provider computer processes the transaction using the interaction token.

Figure 3:
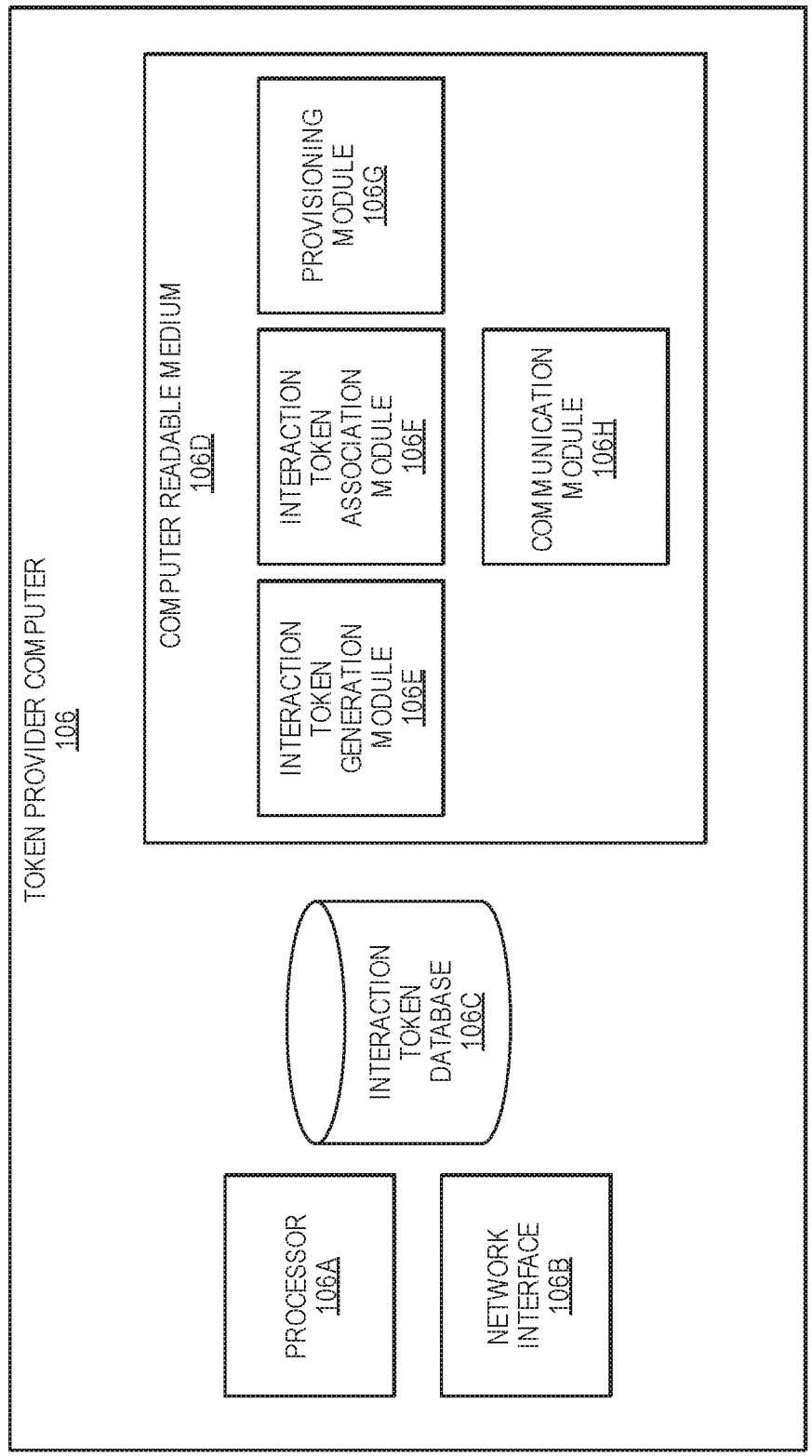
FIG. 3 shows a block diagram of a token provider computer according to an embodiment of the invention.

FIG. 3 shows a block diagram showing basic components that may reside in an exemplary token provider computer 106. The token provider computer 106 may form part of a payment processing network in some embodiments of the invention. The token provider computer 106 comprises a processor 106A, a network interface 106B, an interaction token database 106C, and a computer readable medium 106D.

The computer readable medium 106D may comprise an interaction token generation module 106E, an interaction token association module 106F, a provisioning module 106G, and a communication module 106H. It may also comprise code, executable by the processor 106A for implementing a method comprising: receiving, by a token provider computer from a communication device, an interaction token request message comprising user input data comprising a resource identifier for a resource, a time period to acquire the resource, and an interaction value; analyzing the user input data; determining, by the token provider computer, an interaction token based on the user input data; and transmitting, by the token provider computer, the interaction token to the communication device.

The interaction token generation module 106E may comprise code that causes the processor 106A to generate an interaction token. In some embodiments, the interaction token may include 16 digits and may resemble a PAN.

The interaction token association module 106F may comprise code that causes the processor 106A to associate an interaction token with other user data (e.g., e-mail addresses, telephone numbers, primary account numbers, etc.). For example, the interaction token association module 106F may contain logic that causes the processor 106A to link a generated interaction token with received user input data, and to store the information in the interaction token database 106C.

The provisioning module 106G may comprise code that causes the processor 106A to provision interaction tokens. For example, the provisioning module 106G may contain logic that causes the processor 106A to generate provisioning scripts, and to provide the provisioning scripts, an interaction token, and any other suitable information to a communication device.

The communication module 106H may comprise code that causes the processor 106A to generates messages, reformat messages, and/or otherwise communicate with other entities. For example, the communication module 106H may contain logic that causes the processor 106A to identify an interaction token in a received authorization request message, reformat the authorization request message so that the interaction token is replaced with a user identifier, and forward the authorization request message to an authorization entity computer.

Figure 4:
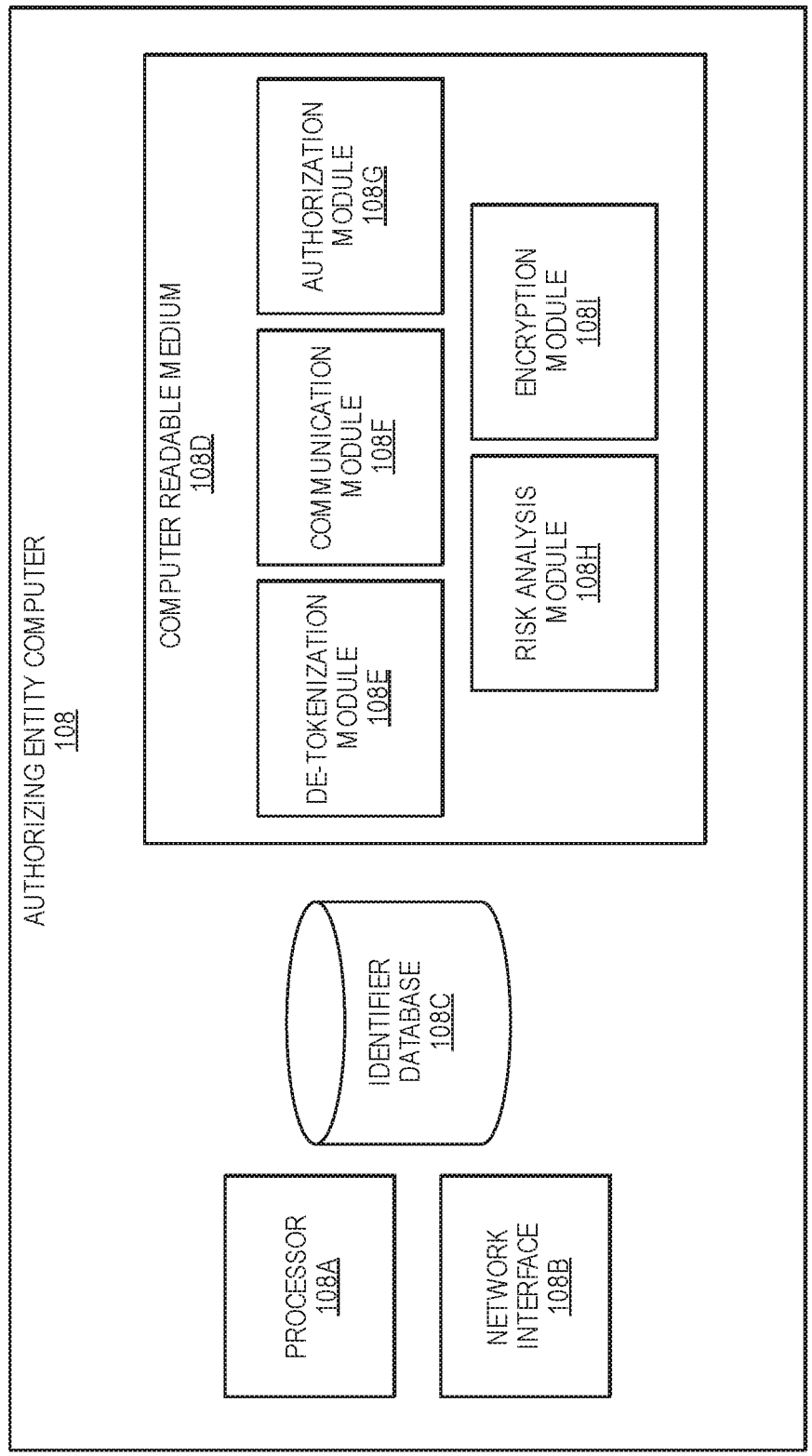
FIG. 4 shows a block diagram of an authorizing entity computer according to an embodiment of the invention.

A block diagram of an authorizing entity computer 108, according to some embodiments of the invention, is shown in FIG. 4. The authorizing entity 108 comprises a processor 108A, a network interface 108B, an identifier database 108C, and a computer readable medium 108D.

The computer readable medium 108D may comprise a de-tokenization module 108E, a communication module 108F, an authorization module 108G, a risk analysis module 108H, an encryption module 108I, and any other suitable software modules.

The de-tokenization module 108E may comprise code that causes the processor 108A to de-tokenize interaction tokens. For example, the de-tokenization module 108E may contain logic that causes the processor 108A to identify real credentials associated with an interaction token, such as a PAN. In some embodiments, the de-tokenization module 108E may be able to query a token provider computer for real credentials associated with an interaction token.

The communication module 108F may comprise code that causes the processor 108A to generate messages, reformat messages, and/or otherwise communicate with other entities.

The authorization module 108G may comprise code that causes the processor 108A to perform authorization processing. For example, the authorization module 108G may contain logic that causes the processor 108A to approve or decline authorization request messages.

The risk analysis module 108H may comprise code that causes the processor 108A to analyze the risk of a transaction or the risk of providing an interaction token to a particular communication device. For example, the risk analysis module 108H may contain logic that causes the processor 108A to determine risk levels associated with de-tokenizing an interaction token, authorizing an interaction token, and/or authorizing an interaction.

The encryption module 108I may comprise code that causes the processor 110A to encrypt data. For example, the encryption module 108I may contain logic that causes the processor 108A to encrypt a real credential (e.g., a PAN).

Figure 5A:
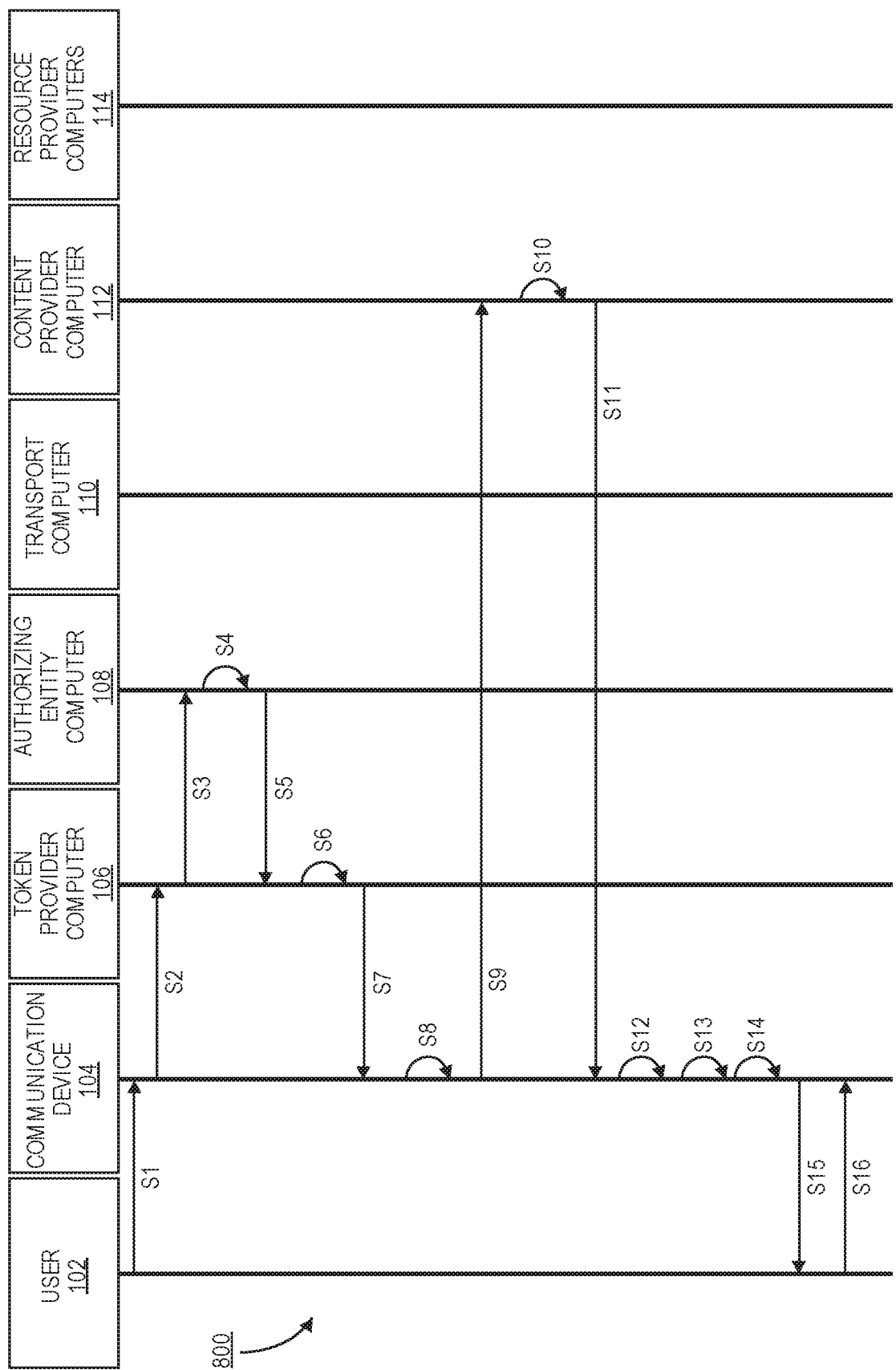
FIGS. 5A and 5B show a process flow diagram detailing how devices in a communication network may interact in order to enact a token provider mediated resource transfer according to embodiments of the invention.
Figure 5B:
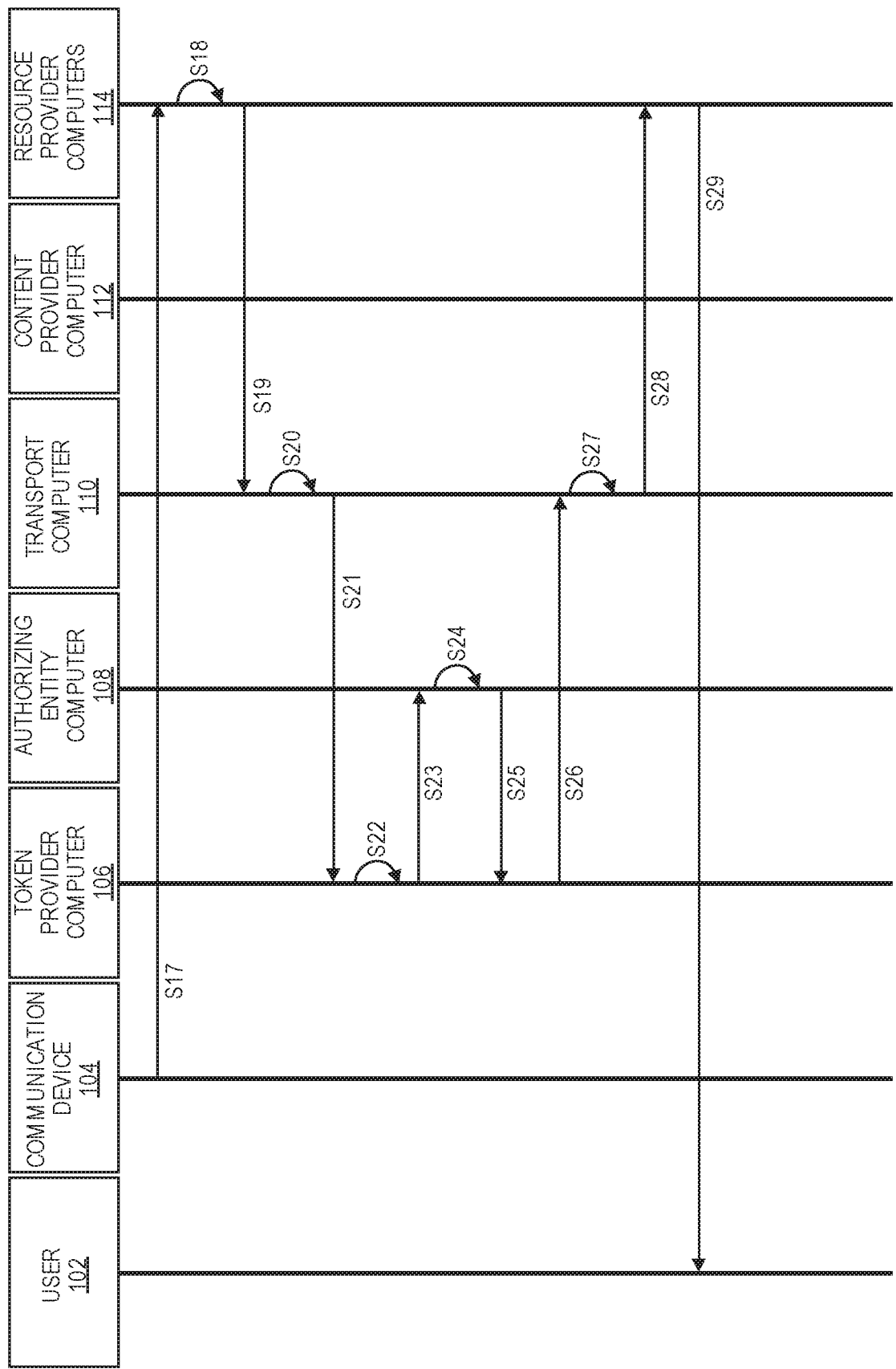

A method 800 according to embodiments of the invention can be described with respect to FIGS. 5A and 5B. Some elements in other Figures are also referred to. The steps shown in the method 800 may be performed sequentially or in any suitable order in embodiments of the invention. In some embodiments, one or more of the steps may be optional.

The various messages in FIGS. 5A and 5B may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, and a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

At step S1, the user 102 may input user input data into a communication device 104. The user input data may include one or more of the following: a user identifier, a resource identifier, an interaction value, an interaction value threshold, a time period in which to acquire that resource, and/or a list of resource providers. For example, a user 102 may input a phone number such as "451-999-9999" and/or an account identifier (e.g., a credit card number) as one or more user identifiers, a "wireless speaker" as a resource identifier, an amount of money, such as "$100.00," that the user 102 is willing to pay for the resource as an interaction value, an amount of money such as "$10.00" as an interaction value threshold, a time period such as "7 days," and a list of merchants such as "Best Buy™, Fry's Electronics™, and Walmart™" as the list of potential resource providers.

The interaction value may indicate the preferred value the user 102 associates with the selected resource. The interaction value threshold may indicate any additional value, which the user may be willing to provide for the resource. Illustratively, a user 102 may input a resource identifier such as "wireless speaker," an interaction value of "$100.00" and an interaction value threshold of "$10.00" into the communication device 104. This may indicate that the user 102 is willing to pay $100.00 for a wireless speaker, and under certain circumstances, may be willing to pay up to $110.00 (the sum of the interaction value and threshold) for the wireless speaker. By implication, the user 102 is unwilling to pay more than $110.00 for the wireless speaker.

At step S2, the communication device 104 may transmit a request for an interaction token and the user information (e.g., an e-mail address) to a token provider computer 106. The request will initiate the interaction token generation process. This request may include the user input data from step S1.

In some embodiments, at step S3, after receiving and analyzing the request and user input data from the communication device 104, the token provider computer 106 may transmit a token approval request message to an authorizing entity computer 108. The authorizing entity computer 108 may hold a real account with funds that can be held by the user 102, and that may be used to fund the interaction token. The token approval request message could include the user input data, including a real credential (e.g., a PAN) transmitted in step S2. In other embodiments, an alias for the real credential is sent instead of the real credential. The alias for the real credential may be used to identify the real credential, which may be stored at the authorizing entity computer 108.

At step S4, after receiving the token approval request message, the authorizing entity computer 108 may review the user input data in the token approval request message. This may involve the authorizing entity computer 108 evaluating the token approval request message using its processor 108A, its identifier database 108C, and the modules stored on its computer readable medium 108D. More specifically, the authorizing entity computer 108 may compare the one or more user identifiers (e.g., a real credential such as a PAN, a phone number, etc.) received in the token approval request message to user identifiers stored in the identifier database 108C to determine if the received one or more user identifiers matches an existing record in the identifier database 108C. The authorizing entity computer 108 may further analyze the user input data using its risk analysis module 108H. For example, the identified resource and interaction value in the token approval request message may be compared to data from the user's previous purchases. If the interaction value is uncharacteristically high relative to the user's past purchases, or if the resource is an uncharacteristic purchase for the user 102, then the authorizing entity computer 108 may flag the interaction as suspicious, and may then decline the token approval request message.

In addition, the authorizing entity computer 108 may determine if the authorizing entity computer 108 has sufficient funds to fund the requested interaction token. If the user input data includes an account number such as a credit or debit card account number, the authorizing entity computer 108 may determine if the user's account has sufficient funds or credit to fund the obligation for the interaction token. If there are sufficient funds or credit in the user's account, then a hold may be placed on the user's account for the value of the interaction token, plus any additional threshold amount.

Step S4 may further involve the authorizing entity computer 108 searching the identifier database 108C for any value reduction elements associated with the user identifier. These value reduction elements could correspond to rewards, coupons, or loyalty points associated with the user's account. Information regarding any such value reduction elements may then be transmitted from the authorizing entity computer 108 to the token provider computer 106. If the value reduction elements are points offered by the authorizing entity computer 108, the value of the interaction token could be raised by the token provider computer 108, since any transaction conducted could use those points as currency. For example, a value reduction element such as loyalty points with value totaling $10.00 could be used to increase the value of an interaction token from $100.00 to $110.00

At step S5, after the authorizing entity computer 108 analyzes the user input data, the authorizing entity computer 108 may transmit the token approval response message to the token provider computer 106. After receiving the token approval response message, the token provider computer 106 may generate an interaction token if the authorizing entity computer 108 approves.

The authorizing entity computer 108 may place a hold on the user's account for the value of the interaction token approved by the authorizing entity computer 108. For example, if the account of the user has a $1000 credit availability, then the credit availability may be decreased by $100 to $900 to account for the value of the interaction token that was approved by the authorizing entity computer 108.

At step S6, the token provider computer 106, having received the token approval response message, can encrypt the generated interaction token before transmitting it to the communication device 104. The encryption key that is used to encrypted the interaction token may be a symmetric key shared with the communication device 104, or a public key of a public-private key pair, where the communication device 104 holds the public key. In some embodiments, the symmetric key may be derived from information associated with the user 102 (e.g., account information associated with the user). In this case, the actual symmetric keys need not be transported between the communication device 104 and the token provider computer 106, but may be independently derived by these devices.

At step S7, the token provider computer 106 may transmit the encrypted interaction token to the communication device 104. Then, at step S8, the communication device 104 may store the interaction token in its memory 104E or its secure memory element 104G.

At step S9, the communication device 104 may transmit a request for further value reduction elements to the content provider computer 112, or any other content provider computers. This request may include some of the user input data, such as the identification of the resource to be acquired and the user provided list of resource providers, as well as the predetermined list of resource providers. Examples of content providers that might operate the content provider computer 112 may include coupon aggregators such as Groupon™, merchants such as Walmart™, and/or product manufacturers such as Lenovo™. These additional value reduction elements may be used to reduce the price of the resource to be obtained. The may be submitted to the resource provider computer 114 in a transaction request message, and the resource provider computer 114 may apply the value reduction to the purchase price of the resource.

At step S10, the content provider computer 112 may search through the content database 112C for value reduction elements based on the request for value reduction elements. This search may involve querying the content database 112C using a relational or SQL-style query, or any other query method which may provide data which meets a certain set of characteristics or conditions. Such value reduction elements may take the form of coupon codes, discounts, or temporary price changes such as sales.

At step S11, the content provider computer 112 may transmit an indication of any additional value reduction elements to the communication device 104. This indication may include any sort of code or identifier which is associated with the additional value reduction elements, or a message indicating an assurance that value reduction elements exist. For example, a resource provider, such as an online merchant, may have a coupon code such as "1094014." The content provider 112 may transmit this code and a merchant or resource identifier to the communication device 104. In some cases, there may be a value reduction element that will be passively applied to the resource transfer. As an example, a merchant may have a 25% off sale. In this case, the content provider 112 may transmit a message to the communication device 104 which indicates that a value reduction element of 25% exists.

At step S12, the communication device 104 may store value reduction elements that it may have received in step S11 in a memory element in the communication device 104. As an example, if the user 102 obtained a value reduction element such as a coupon for "$10.00" off of the resource to be acquired, then the processor 104A may store the coupon in memory such that it may be applied later when the purchasing decision has been made by the communication device 104.

At step S13, the communication device 104 may search for a specific resource provider from among the resource providers operating the resource provider computers 114 to obtain the desired resource. For example, the communication device 104 may perform a Web search using a search engine in order to determine the specific resource provider. The communication device 104 may also, over the communication network 116, directly communicate with the resource providers 114 and query them for information appropriate to the search.

As an example, consider a resource such as a "wireless speaker," an interaction value of "$100.00," and an interaction value threshold of "$10.00." The search of step S13 may involve the communication device 104 searching using a search engine, or by directly querying each merchant from among a list of merchants for a "wireless speaker" which costs less than "$110.00" (the sum of the interaction value and interaction value threshold), and which ideally costs less than "$100.00" (the interaction value). The merchants may respond by transmitting the price (a specific value) at which they are willing to provide the resource to the user 102.

At step S14 the communication device 104 may evaluate the results of the search in order to determine a specific resource provider from among the resource providers operating the resource provider computers 114. This may involve the communication device 104 performing a logical operation, using the processor 104A, which selects a specific resource provider based on the interaction value, interaction value threshold, and the results of the search.

In some embodiments, the communication device 104 may first compare each of the specific values produced by the search of step S13 in order to find the lowest value among the specific values. The communication device 104 may then determine if the specific value is less than the interaction value, or if not, if the specific value is less than the sum of the interaction value and the interaction value threshold. The communication device 104 may also take into account other factors such as delivery time when deciding on which resource provider to select.

The communication device 104 may proceed differently depending on the results of the evaluation of step S14. For example, if the communication device 104 determines that the lowest specific value resource provider is willing to provide the resource at a specific value less than the interaction value, then the communication device 104 may conclude that it is appropriate to initiate a resource transfer between the user 102 and the specific resource provider. If the communication device 104 determines that lowest specific value resource provider is willing to provide the resource at a specific value less than the sum of the interaction value and the interaction value threshold, but greater than the interaction value itself, the communication device 104 may conclude that it is appropriate to seek approval for the resource transfer from the user 102. If the communication device 104 determines that the lowest specific value resource provider is unwilling to provide the resource at a specific value less than the sum of the interaction value and the interaction value threshold, then the communication device 104 may conclude that it is not possible at this time to proceed with a resource transfer.

If the communication device 104 determines that it is not possible to proceed with a resource transfer, it may evaluate the time limit input by the user 102. This evaluation might involve using the communication device processor 104A to determine the difference between the current time and the time when the user input was received (the "elapsed time"). This difference may be compared to the time limit provided with the user input. If the elapsed time exceeds the time limit, the communication device 104 may determine that the interaction token has exceeded its lifespan and can no longer be used to purchase the desired resource. If this is the case, the communication device 104 may not need to proceed with steps S15-S31. If the communication device 104 determines that the elapsed time does not exceed the time limit, it may repeat the search process of step S13 and the evaluation process of step S14 until the elapsed time exceeds the time limit specified by the user.

At step S15, the communication device 104 make a request to the user 102 based on the results of the evaluation performed at step S14. If the search and evaluation resulted in selecting a resource provider willing to provide the resource at a value less than the interaction value, the message may simply indicate to the user 102 that a resource transfer, using the interaction token, is being conducted with the identified resource provider on their behalf at a specific price. This message may be displayed to the user 102 as text or images on the communication device display 104B, or communicated to the user 102 via another appropriate method.

If the communication device 104 determined that the specific resource provider is willing to provide the resource for a specific value greater than the interaction value, but less than the sum of the interaction value and the threshold value, then the communication device 104 may request that the user 102 approve of the resource transfer.

At step S16, the user 102 may input a reply to the message into the communication device 104. As an example, if the communication device 104 transmitted a message requesting approval for the resource transfer, the user 102 may use the communication device data input/output 104C in order to indicate approval of the resource transfer. This could be accomplished using any appropriate user input device, such as buttons, a touch screen, or a keyboard.

At step S17 the communication device 104 may transmit a transaction request message, which includes the interaction token, to the specific resource provider computer 114. The transaction request message may also comprise any obtained value reduction elements that may be appropriately passed to the resource provider computer 114. The transaction request message may indicate to the specific resource provider associated with the resource provider computer 114 that the user 102 wishes to acquire the resource and wishes to provide the interaction token to pay for the resource. In some embodiments, the interaction token may be a 16 digit ISO 8583 compliant interaction token. As an illustration, the transaction request message may indicate that the user 102, a consumer, wishes to purchase a resource such as a wireless speaker, and is providing the interaction token as a payment credential. The transaction request message may also comprise a shipping address of the user 102, and any other pertinent information necessary to complete the transfer of the desired resource.

At step S18, after the resource provider computer 114 receives the transaction request message, the specific resource provider associated with the resource provider computer 114 may evaluate the message. In some embodiments, the resource provider computer 114 may generate an authorization request message comprising the interaction token and the amount of the resource to be acquired.

At step S19, the resource provider computer 114 may transmit the authorization request message to the transport computer 110. At step S20, the transport computer 110 may evaluate the message sent from the resource provider computer 114, and may route it to the token provider computer 106.

At step S21, the transport computer 110 may transmit the authorization request message to the token provider computer 106. At step S22, after the authorization request message is received by the token provider computer 106, the token provider computer 106 may de-tokenize the received interaction token in order to determine the real account credential (e.g., a PAN) 108 associated with the interaction token. This may involve querying the interaction token database 106C for data entries matching the provided interaction token. The token provider computer 106 may also check to see if the transaction that is being conducted is consistent with the constraints set for the interaction token. For instance, if the interaction token is authorized for a specific dollar limit, then the token provider computer 106 may compare the transaction amount in the authorization request message with the dollar limit used to generate the interaction token. If the transaction is not consistent with the interaction token constraints, the token provider computer 106 may decline the transaction and may communicate this to the transport computer 110 and the resource provider computer 114.

At step S23, if the interaction token satisfies the constraints for the interaction token, the token provider computer 106 may modify the authorization request message to include the real credential, rather than the interaction token. The modified authorization request message may then be sent to the authorizing entity computer 108.

At step S24, after receiving the modified authorization request message, the authorizing entity computer 108 may determine whether or not the transaction is authorized. It may, for example, check to see if the account balance or available credit limit of the account associated with the real credential is greater than the transaction amount in the authorization request message. It may also perform fraud checks and other transaction analyses.

At step S25 the authorizing entity computer 108 may generate and transmit an authorization response message to the token provider computer 106.

At step S26, after receiving the authorization response message from the authorizing entity computer, the token provider computer 106 may transmit the authorization response message to the transport computer 110. In some embodiments, the real credential in the authorization response message may be replaced with the interaction token by the token provider computer 106, before it is forwarded on to the transport computer 110.

At step S27, the transport computer 110 may determine which resource provider computer 114 is associated with the authorization response message. At step S28, the transport computer 110 may transmit the authorization response message to the resource provider computer 114.

At step S29, the specific resource provider associated with the resource provider computer 114 may initiate transfer of the resource to the user 102. For example, if the resource provider is an online merchant, and the resource is a good such as a wireless speaker, the merchant may begin the process of shipping the good to the user 102.

At a later point in time, a settlement and clearing process may occur between the authorizing entity computer 108, the transport computer 110, and an intermediate payment processing network. The payment processing network may operate or contain the token provider computer 106.

Embodiments of the invention have a number of advantages. As stated previously, conventional interaction token systems could be improved to be more secure, more economical, and more convenient to consumers.

Embodiments of the invention provide for interaction tokens that have a narrow token-domain. They have a defined resource to be acquired, value, and time limit. If a hacker, malicious user, or thief somehow illegally acquires an interaction token according to embodiments of the invention, they have a finite amount of time to purchase the good the user wishes to purchase, at the price set by the user, for the user. This is a considerable advantage over conventional token schemes, where tokens can be used as a direct substitute for a PAN and could be used for potentially any purchase.

Additionally, embodiments of the invention provide for additional convenience to users by initiating resource transfers automatically. With embodiments of the invention, a user does not need to actively search through dozens of resource providers to find the resource they need at a price they are willing to pay. They can simply input the resource, a time limit, and an interaction value into a communication device. The communication device can then automatically and continuously search for the resource and automatically initiate a resource transfer when it is found. This reduces the time and energy necessary to acquire resources.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
    receiving, by a communication device operated by a user, user input data comprising one or more user identifiers, a resource identifier for a resource, a time period to acquire the resource, and an interaction value;
    initiating, by the communication device, generation of an interaction token based at least upon the user input data, wherein the generation of the interaction token comprises:
        determining a user account associated with the user based on the one or more user identifiers,
        initiating placement of a hold for funds on the user account for the interaction value and a threshold value, and
        generating the interaction token to correspond with the interaction value, the threshold value, and the time period to acquire the resource;
    initiating, by the communication device, a search from among one or more resource provider computers for the resource over the time period, wherein the search selects a specific resource provider associated with a specific resource provider computer from among the one or more resource provider computers, the specific resource provider providing the resource at a specific value, and wherein the search for the resource over the time period includes an elapsed time period and a second time period to identify the specific resource provider, wherein the elapsed time period includes a difference between a current time and a time that the user input data was received by the communication device;
    determining whether the specific value is less than or equal to the interaction value and the threshold value;
    transmitting, by the communication device and to a content provider, a request for value reduction elements that can be applied to the resource, the request including the resource and a user provided list of resource providers including the specific resource provider;
    receiving, by the communication device and from the content provider, a response including the value reduction elements;
    initiating transmitting, by the communication device, the interaction token to the specific resource provider computer associated with the specific resource provider, wherein the specific resource provider computer processes a transaction using the interaction token; and
    providing, by the communication device, the value reduction elements to the specific resource provider.

2. The method of claim 1, further comprising:
    upon providing, by the communication device, an identification of the resource to be acquired and the interaction token to the specific resource provider computer, initiating, by the specific resource provider, a transfer of the resource to be acquired to the user.

3. The method of claim 1, wherein the interaction token is a substitute for a real credential.

4. The method of claim 1, wherein the communication device is a mobile phone.

5. The method of claim 1, wherein the interaction token is a sixteen digit number.

6. The method of claim 1, wherein determining whether the specific value is less than or equal to the interaction value comprises determining that the specific value is less than or equal to the interaction value.

7. The method of claim 1, wherein determining whether the specific value is less than or equal to the interaction value comprises determining that the specific value is not less than or equal to the interaction value, but is less than the interaction value and the threshold value, and wherein the method further comprises:
    requesting, by the communication device, approval for the transaction for the resource at the specific value; and
    receiving, by the communication device, the approval from the user to conduct the transaction at the specific value.

8. A communication device comprising:
    a processor; and
    a non-transitory computer readable medium coupled to the processor, the non-transitory computer readable medium comprising code executable by the processor for implementing a method comprising:
    receiving user input data comprising one or more user identifiers, a resource identifier for a resource, a time period to acquire the resource, and an interaction value;
    initiating generation of an interaction token based at least upon the user input data, wherein the generation of the interaction token comprises:
        determining a user account associated with a user based on the one or more user identifiers,
        initiating placement of a hold for funds on the user account for the interaction value and a threshold value, and
        generating the interaction token to correspond with the interaction value, the threshold value, and the time period to acquire the resource;
    initiating a search from among one or more resource provider computers for the resource over the time period, wherein the search selects a specific resource provider associated with a specific resource provider computer from among the one or more resource provider computers, the specific resource provider providing the resource at a specific value, and wherein the search for the resource over the time period includes an elapsed time period and a second time period to identify the specific resource provider, wherein the elapsed time period includes a difference between a current time and a time that the user input data was received by the communication device;
    determining whether the specific value is less than or equal to the interaction value and the threshold value;
    transmitting to a content provider a request for value reduction elements that can be applied to the resource, the request including the resource and a user provided list of resource providers including the specific resource provider; and
    receiving, from the content provider, a response including the value reduction elements;
    initiating transmitting the interaction token to the specific resource provider computer associated with the specific resource provider, wherein the specific resource provider computer processes a transaction using the interaction token; and providing the value reduction elements to the specific resource provider.

9. The communication device of claim 8, wherein the method further comprises:

upon providing an identification of the resource to be acquired and a user identification to the specific resource provider computer, initiating, by the specific resource provider, a transfer of the resource to be acquired to the user.

10. The communication device of claim 8, wherein the interaction token is a substitute for a real credential.

11. The communication device of claim 8, wherein the communication device is a mobile phone.

12. The communication device of claim 8 further comprising a secure memory capable of storing the interaction token.

13. The communication device of claim 8, wherein the interaction token is a 16 digit number.

\* \* \* \* \*